(12) United States Patent
Tsao et al.

(10) Patent No.: US 10,435,174 B2
(45) Date of Patent: Oct. 8, 2019

(54) OPTICAL DEVICE FOR LIGHTING AND/OR SIGNALING LIGHT FOR AIRCRAFT AND LIGHT COMPRISING SUCH AN OPTICAL DEVICE

(71) Applicant: Zodiac Aero Electric, Montreuil (FR)

(72) Inventors: Christian Tsao, Rosny sous Bois (FR); Maxime De Truchis, Paris (FR)

(73) Assignee: ZODIAC AERO ELECTRIC, Montreuil (FR)

( * ) Notice: Subject to any disclaimer, the term of this patent is extended or adjusted under 35 U.S.C. 154(b) by 0 days.

(21) Appl. No.: 14/844,987

(22) Filed: Sep. 3, 2015

(65) Prior Publication Data
US 2016/0068276 A1    Mar. 10, 2016

(30) Foreign Application Priority Data

Sep. 3, 2014 (FR) ...................... 14 58221

(51) Int. Cl.
| | |
|---|---|
| *B64D 47/02* | (2006.01) |
| *B64D 47/04* | (2006.01) |
| *F21V 7/00* | (2006.01) |
| *G02B 19/00* | (2006.01) |
| *F21V 5/04* | (2006.01) |
| *F21V 13/04* | (2006.01) |

(52) U.S. Cl.
CPC ............. *B64D 47/02* (2013.01); *B64D 47/04* (2013.01); *F21V 5/04* (2013.01); *F21V 7/0091* (2013.01); *G02B 19/0028* (2013.01); *G02B 19/0061* (2013.01); *F21V 13/04* (2013.01)

(58) Field of Classification Search
CPC ..... B64D 47/02–04; F21V 5/04; F21V 5/046; F21V 7/0091; F21V 13/04; G02B 19/0028; G02B 3/00; G02B 6/0058
USPC ...................... 362/326–340, 470, 309, 296.1
See application file for complete search history.

(56) References Cited

U.S. PATENT DOCUMENTS

| | | | | |
|---|---|---|---|---|
| 2,215,900 A | * | 9/1940 | Bitner | ....................... F21V 5/04 362/309 |
| 4,681,405 A | * | 7/1987 | Balogh | .................... G02B 3/08 348/E5.136 |

(Continued)

FOREIGN PATENT DOCUMENTS

| | | |
|---|---|---|
| CN | 203215508 U | 9/2013 |
| DE | 20 2014 003 075 U1 | 4/2014 |

(Continued)

OTHER PUBLICATIONS

French Search Report dated May 19, 2015, issued in corresponding French Application No. 1458221, filed Sep. 3, 2014, 3 pages.

*Primary Examiner* — Anh T Mai
*Assistant Examiner* — Michael Chiang
(74) *Attorney, Agent, or Firm* — Christensen O'Connor Johnson Kindness PLLC

(57) ABSTRACT

This optical device for lighting and/or signaling system comprises a set of at least one collimator (10) each comprising a light ray input surface (13) refracting the light, a collimated light beam output surface (17) and a reflecting surface (16) intended to reflect light beams refracted by the input surface and suitable for reflecting the rays in parallel directions. The input surface (13) comprises a set of surfaces (S1, S2, S3) refracting the light that are juxtaposed and suitable for directing the rays from the source towards the reflecting surface.

8 Claims, 5 Drawing Sheets

(56) References Cited

U.S. PATENT DOCUMENTS

| | | | |
|---|---|---|---|
| 6,547,423 B2* | 4/2003 | Marshall | F21V 5/04 257/E33.072 |
| 7,506,998 B2* | 3/2009 | Ansems | G02B 6/002 362/245 |
| 8,033,690 B1 | 10/2011 | Shatz et al. | |
| 2006/0291243 A1* | 12/2006 | Niioka | G02B 3/08 362/607 |
| 2008/0030990 A1* | 2/2008 | Hanney | F21V 5/002 362/240 |
| 2012/0313547 A1 | 12/2012 | Barnett et al. | |
| 2013/0249375 A1* | 9/2013 | Panagotacos | H05B 33/0803 313/13 |
| 2013/0272028 A1* | 10/2013 | Hong | G02B 6/0035 362/612 |

FOREIGN PATENT DOCUMENTS

| | | |
|---|---|---|
| WO | 2012/042436 A1 | 4/2012 |
| WO | 2013/029400 A1 | 3/2013 |

* cited by examiner

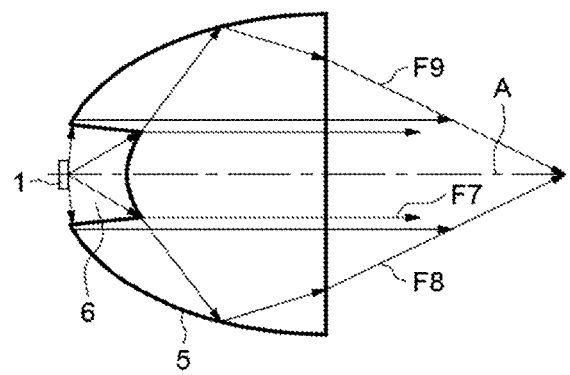
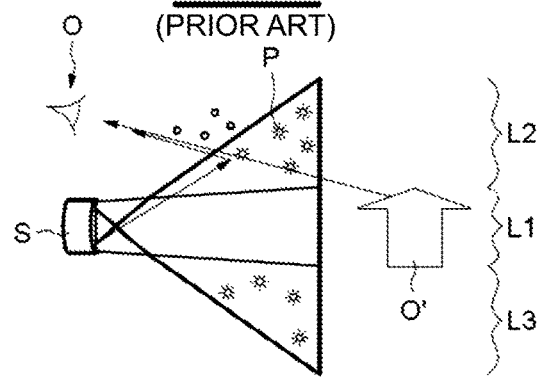
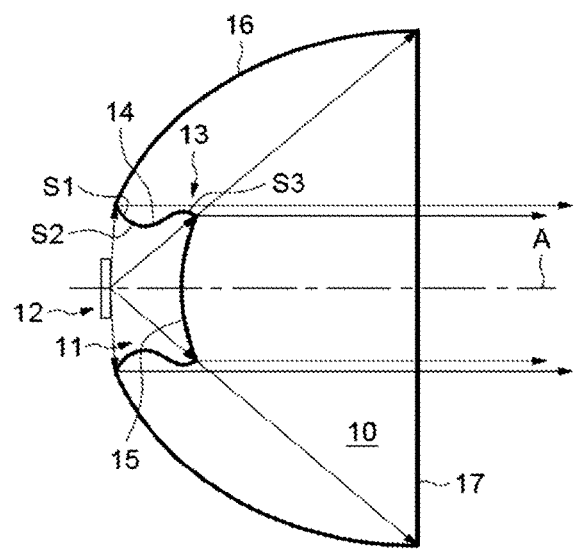

OPTICAL DEVICE FOR LIGHTING AND/OR SIGNALING LIGHT FOR AIRCRAFT AND LIGHT COMPRISING SUCH AN OPTICAL DEVICE

SUMMARY

The present invention relates, generally, to lighting and/or signaling systems and relates more particularly to the lighting and/or signaling systems installed onboard aircraft.

In a particular embodiment, the invention relates to the lighting and/or signaling systems, notably for aircraft, that use lighting sources of light-emitting diode, or LED, type.

As is known, an aircraft conventionally comprises external lighting systems that can each perform one or more lighting functions. These lighting systems are activated according to the flight or taxiing phases of the aircraft.

An aircraft thus comprises, notably, landing lights which are generally positioned on the root of the wings and which are intended to light the landing runway when the aeroplane is in flight and in final approach phase.

On commercial aeroplanes, the take-off lights, whose optical characteristics are similar to those of the landing lights, are also provided on the front landing gear leg of the aeroplane. These lights are intended to illuminate the runway when the aeroplane is moving at high speed on the ground, during phases of acceleration when taking off or of deceleration when landing.

The light fluxes supplied by the landing lights and by the take-off lights are characterized by beams with identical photometric data. In effect, the light beams delivered by the landing lights and by the take-off lights have identical forms and, in particular, an identical spatial distribution of light intensity. They are circular beams, or oblong with 10% of the intensity peak. This spatial distribution of intensity is staged according to an angle of the order of 13° along the horizontal axis and of 8° along the vertical axis.

However, the aiming angles of the light beams are different. In effect, the landing lights aim along the rectilinear slope of descent of the aeroplane. During this phase, the area to be lit corresponds to the point of the runway where the aeroplane has to touch down. It is in fact upon this point that the pilot has to focus his or her gaze.

On the other hand, when accelerating on take-off or when decelerating on landing, in particular after the front landing gear comes into contact with the ground, take-off lights provide the lighting on the ground as far as possible in front of the aeroplane, their aim being substantially parallel to the ground. The area to be lit corresponds to the end of the runway.

The lighting and/or signaling systems produced from LED sources use optical devices of dioptre type, such as lenses or prisms, of reflector (mirror) type or a combination of these two types of optical devices, in order to shape the light flux delivered by the LEDs. The sources of LED type can even be associated with catadioptrical systems.

It has been found that the optical devices conventionally used to implement lighting systems intended to be installed onboard aircraft do not optimize the flux from the LED source.

Reference in this respect will be made to FIG. 1 which schematically illustrates a lighting system comprising an LED light source 1 and a reflector 2, of mirror type, reflecting the light beam emitted by the light source 1 to generate light beams F1 parallel to the optical axis A of the system. As can be seen, the light beams F2 from the light source 1 which do not reach the reflector 2 are lost and do not participate in the actual lighting function.

Thus, a not-inconsiderable portion, approximately 50% of the initial flux emitted by the light source, passes directly through the opening of the mirror and is lost as direct light.

Referring to FIG. 2, when a dioptric device 3 of lens type is used, a portion of the light flux emitted by the LED source 1 is picked up by the lens to generate useful beams F3 parallel to the optical axis A of the lighting system while the light beams F4 and F5, which constitute a not-inconsiderable portion of the flux from the light source 1, do not pass through the lens and are lost as direct light.

When an optical device of mirror type and a dioptric device of lens type are combined (FIG. 3), with elements identical to those of FIGS. 1 and 2 bearing the same reference symbols, mechanical interfaces and links 4 for relative positioning of the lens 3 and of the reflector 2 create a masking of the source 1 relative to the optical surfaces, absorbing a portion of the flux from the source such that the useful beam F6 does not incorporate all of the beam emitted by the source.

Referring finally to FIG. 4, which shows an exemplary embodiment of a lighting and/or signaling system using a catadioptrical collimator, it has been found that the use of such an optical device makes it possible to reduce the loss of flux but without cancelling it completely.

As can be seen in this figure, a catadioptrical collimator 5 is conventionally produced in a solid material transparent to light and comprises a globally tapered housing 6 relative to which the source 1 is positioned.

The input surface for the light beams from the source, situated in the bottom of the housing 6, is adapted to direct the beams parallel to the optical axis A of the lighting system (beam F7). According to this arrangement, there still remain non-collimated beams (beams F8 and F9) which do not contribute to the effective beams.

As shown in FIG. 5, in which a source S is schematically represented, in this case a lighting light, associated with an optical device suitable for generating a useful light flux L1 consisting of correctly collimated light beams, the light beams lost as direct light or that are not collimated create a nuisance for an observer O, in this case a pilot, by back-scattering of the light on particles P in suspension, generating a nuisance for the viewing of an object O'.

The aim of the invention is therefore to mitigate the abovementioned drawbacks and to optimize, without loss of flux, the effectiveness of a collimator, notably catadioptrical, on all of the flux from an LED source while redirecting this flux in the useful light beam.

The subject of the invention, according to a first aspect, is therefore an optical device for lighting and/or signaling system, comprising a set of at least one collimator each comprising a light ray input surface refracting the light, a collimated light ray output surface and a reflecting surface intended to reflect light beams refracted by the input surface and suitable for reflecting the rays in parallel directions.

The input surface comprises a set of surfaces refracting the light that are juxtaposed and suitable for directing the rays from the source towards the reflecting surface.

Producing the input surface from a plurality of juxtaposed surfaces refracting the light makes it possible to significantly improve the light efficiency of the optical device and consecutively reduce the electrical power consumed and, consequently, the overall weight of the lighting system in which the optical device is mounted, which is an important criterion in the aeronautical field.

It has moreover been found that the juxtaposed surfaces refracting the light, which are arranged around the solid angle of emission of the light flux, make it possible to redirect all of the flux from the LED source in the useful light beam. This makes it possible to improve the contrast of the observed scene by eliminating the lost stray light which creates a light fog in front of the visual field, strongly marked in difficult climatic conditions, notably in the presence of mist, rain, snow, etc.

Advantageously, the input surface comprises a set of globally tapered coaxial surfaces juxtaposed along the general optical axis of the optical device.

In one embodiment, the generatrix of each tapered surface is concave, with concavity turned alternately towards the reflecting surface and towards a housing for receiving the light source.

In various embodiments, the generatrices can comprise at least one form chosen from a parabola, a circle or a hyperbola.

Similarly, the reflecting surface can be parabolic.

It can be formed from a set of juxtaposed globally tapered coaxial surfaces.

With regard to the output surface, the latter can be smooth or striated.

If striations are used, the latter can exhibit variable characteristics according to their position in the output surface.

According to yet another feature of the optical device according to the invention, the input surface comprises a circular transverse input surface.

Advantageously, provision will be made for the diameter of the circular transverse input surface to be smaller than that of the base of the reflecting surface from which the input surface refracting the light extends.

Furthermore, the transverse input surface advantageously constitutes a dioptre.

Another subject of the invention, according to a second aspect, is a lighting and/or signaling light for aircraft comprising an optical device as defined above.

DESCRIPTION OF THE DRAWINGS

Other aims, features and advantages of the invention will become apparent on reading the following description, given purely as a nonlimiting example, and with reference to the attached drawings in which:

FIGS. 1 to 4, already mentioned, schematically illustrate the general structure of various embodiments of the lighting and/or signaling systems according to the prior art;

FIG. 5 illustrates the drawbacks of the prior art;

FIG. 6 schematically illustrates an embodiment of an optical device according to the invention;

DETAILED DESCRIPTION

Figure 1:
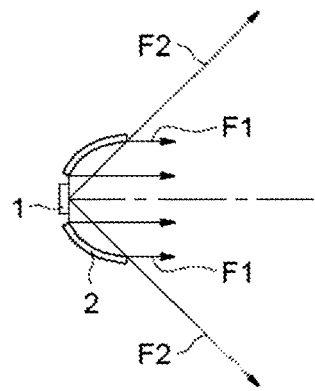
Figure 2:
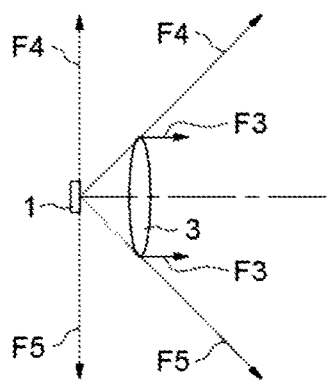
Figure 3:
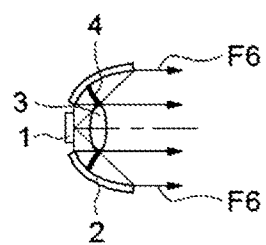

Reference is made first of all to FIG. 6 which schematically illustrates an exemplary embodiment of an optical device according to the invention.

In the exemplary embodiment envisaged, it is an optical device for lighting and/or signaling light for aircraft, notably for commercial aeroplanes.

This optical device constitutes a collimator and is intended to collimate all of the light flux emitted by a light-emitting diode LED to deliver, as output, a set of collimated rays which extend parallel to the optical axis A of the device, by eliminating the light fluxes lost as direct light.

In the exemplary embodiment represented, the optical device constitutes a catadioptrical collimator. It is produced in a solid material, for example in polycarbonate or in polymethylmethacrylate (PMMA).

As can be seen in FIG. 6, the optical device, designated by the general numeric reference 10, is globally parabolic and comprises a generally cylindrical housing 11 formed at the point of the apex of the collimator. A light source 12, in this case a light-emitting diode LED, is positioned at the point of the apex of the parabola.

The optical device 10 comprises an input surface 13 for the light rays in the collimator 10, refracting the light and consisting of the radial peripheral surface 14 and of the transverse bottom surface 15 of the housing 11, a parabolic reflecting surface 16 intended to reflect the rays refracted by the input surface 13 refracting the light and an output surface 17 for the collimated light rays.

As can be seen, the radial peripheral surface 14 is formed by a succession of juxtaposed tapered surfaces S1, S2 and S3, here three of them.

"Juxtaposed" should be understood to mean, in the context of the present description, a side-by-side positioning of the tapered surfaces so as to form a continuous or non-continuous surface.

The generatrix of each of these conical sections can adopt any form. It can be parabolic, circular or hyperbolic.

It will however be noted that the peripheral surface 14 comprises a succession of concave portions juxtaposed from the apex of the parabola to the output surface 17 such that the concave surfaces alternatively have a concavity turned towards the interior of the housing and a concavity turned towards the parabolic reflecting surface 16.

These tapered surfaces are formed in such a way that the rays are refracted as if they were emitted from the focus of the parabola forming the reflecting surface 16.

Furthermore, the diameter of the transverse bottom surface is smaller than that of the proximal end, that is to say of the base of the housing 11, where the housing is connected to the parabolic surface 16.

Finally, the transverse bottom surface constitutes a dioptre ensuring the collimation of the light beams which pass through it according to light beams parallel to the optical axis A of the device.

By virtue of this arrangement, all of the light flux from the LED light source 12 is refracted towards the parabolic surface 16. The tapered sections S1, S2 and S3 are oriented, relative to the optical axis A of the device, such that the rays from the source 12 are refracted towards the parabolic reflecting surface 16 then reflected parallel to the optical axis A of the device 10.

Thus, all of the light flux from the LED source 12 forms the collimated useful beam delivered as output from the optical device.

Figure 7:
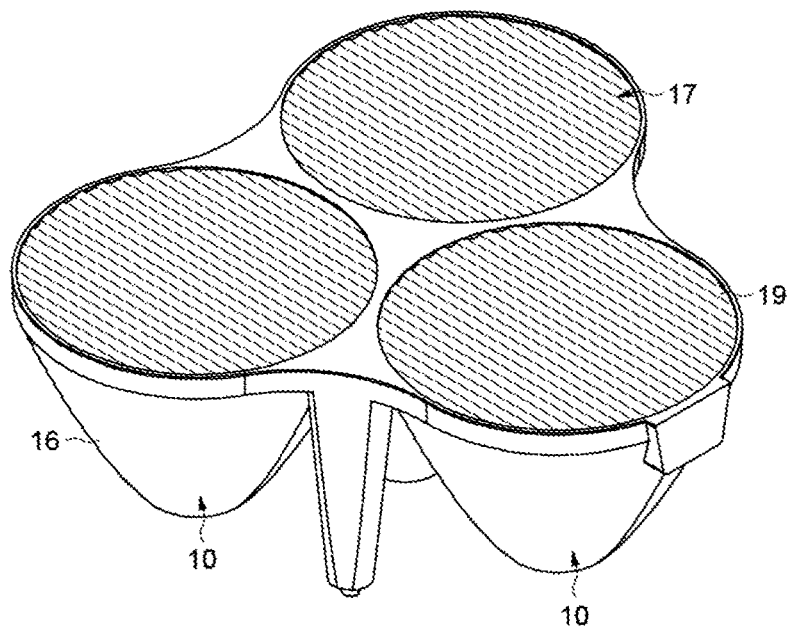
FIG. 7 is a perspective view from above of an exemplary embodiment of an optical device according to the invention.
Figure 8:
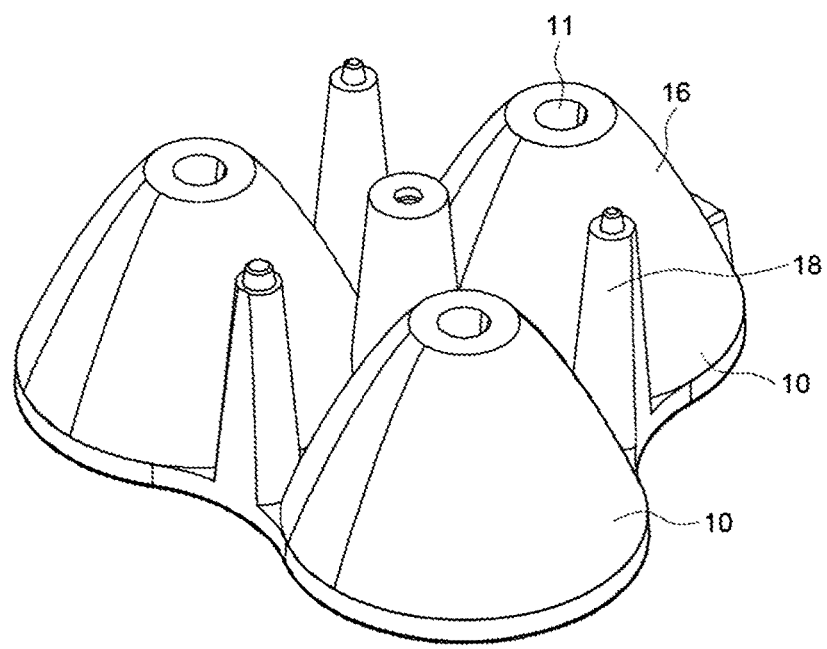
FIG. 8 is a perspective view from below of the device of FIG. 7.
Figure 9:
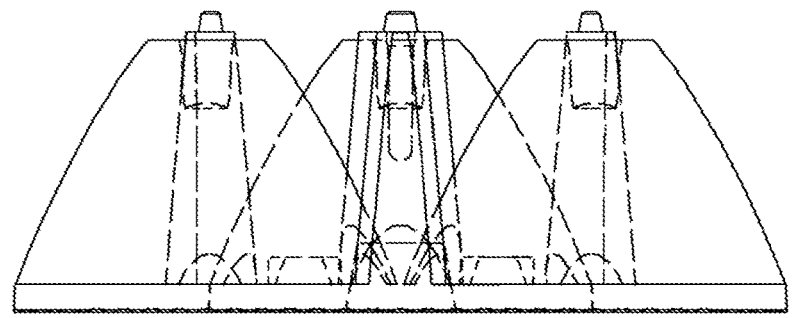
FIG. 9 is a profile view of the device of FIGS. 7 and 8.

Reference is now made to FIGS. 7, 8 and 9 which illustrate a particular embodiment of such an optical device.

As can be seen, in this embodiment the device comprises three identical collimators, each produced according to the arrangement described previously with reference to FIG. 6.

These three collimators are produced in a single piece moulded according to a form with three lobes to facilitate their nesting in a light and comprise feet 18 used to fix the device onto a light.

Figure 10:
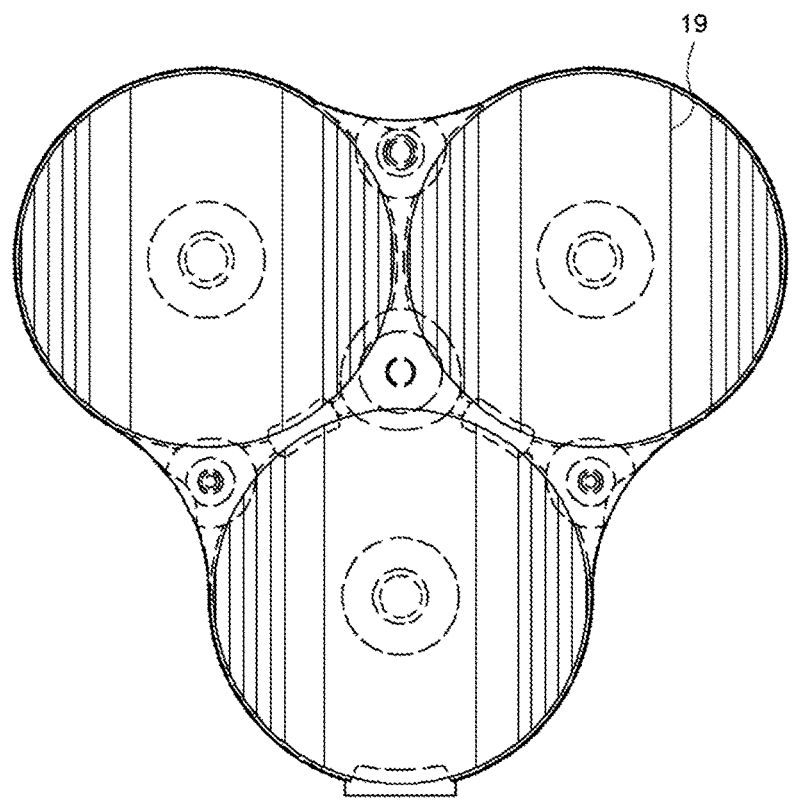
FIG. 10 is a plan view of another exemplary embodiment of an optical device according to the invention.

As FIG. 7 shows, the collimated ray output surface 17 is, here, striated. It will however be noted that there is no departure from the scope of the invention when the output surface is smooth. As FIG. 10 also shows, the striations 19 can be regularly distributed over the output surface or be irregularly distributed, according to their position on the output surface. These striations are intended to spread the collimated light beam, for example horizontally or vertically. Similarly, the striations may be more marked, that is to say deeper, either at the centre or at the periphery, according to the characteristics of the light beam to be obtained.

It will be noted that, in the exemplary embodiments which have just been described, the reflecting surface 16 is parabolic. This reflecting surface can be produced in the form of a succession of juxtaposed tapered surfaces delimiting respective concave surfaces alternately turned towards the interior of the collimator 10 and towards the exterior.

Figure 11:
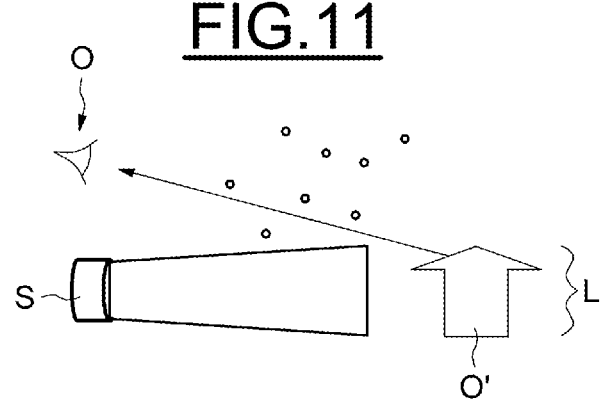
FIG. 11 shows the results obtained by means of an optical device according to the invention.

As indicated previously, the optical device which has just been described makes it possible to collimate all of the light flux emitted by the LED source 12. As shown in FIG. 11, which shows the light flux emitted by a light source equipped with such an optical device, by virtue of the invention, all of the light flux emitted by the source S is converted into useful light L, no annoying backscattering being observed by an observer O. Thus, all of the collimated beam constitutes a useful light for the lighting of an object O', significantly improving the light efficiency of the assembly formed by the LED source 12 and the collimator 10, making it possible to reduce the electrical power consumed and the overall weight of the equipment.

As indicated previously, the optical device which has just been described is intended to be incorporated in a lighting and/or signaling light, in particular for aircraft.

Figure 12:
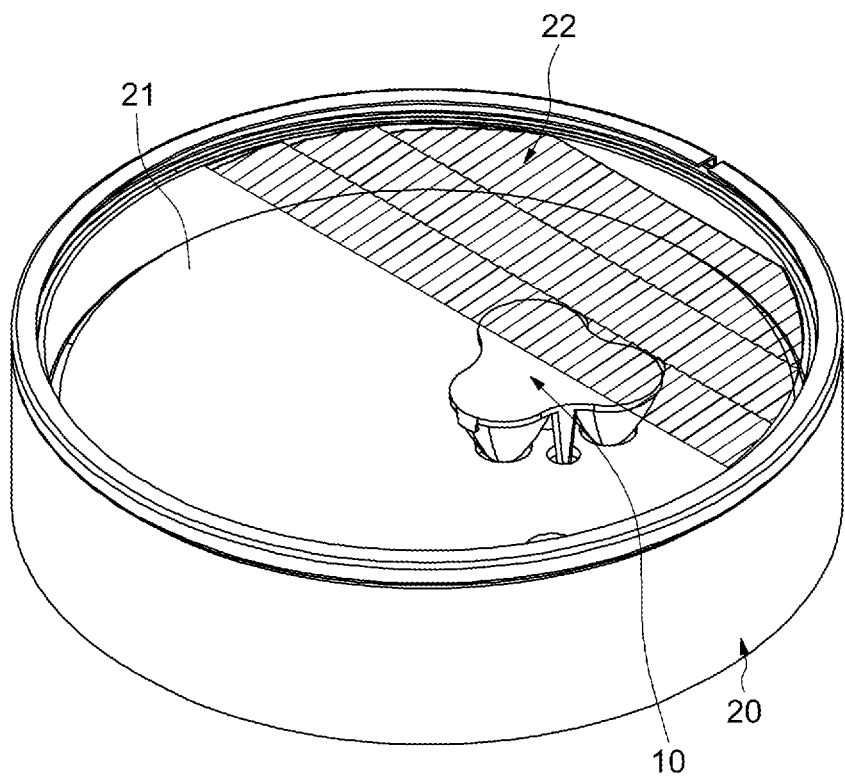
FIG. 12 is a perspective view of a lighting and/or signaling light provided with an optical device according to the invention.

A nonlimiting exemplary embodiment of such a light is represented in FIG. 12, in which only one optical device is represented. As can be seen, the light essentially comprises a casing 20 comprising, internally, a plate 21 for mechanically fixing and electrically connecting a set of one or more optical devices 10 as described previously with reference to FIGS. 7 to 10, and a protective lens 22, here locally striated, covering all of the optical devices.

The invention claimed is:

1. Optical device for lighting and/or signaling system, comprising a set of three collimators (10) each comprising a light ray input surface (13) configured to refract light rays, a collimated light beam output surface (17) and a reflecting surface (16) intended to reflect light rays refracted by the light ray input surface and suitable for reflecting the light rays in parallel directions, characterized in that the light ray input surface (13) comprises a set of three surfaces (S1, S2, S3) refracting the light rays, juxtaposed and suitable for directing the light rays from a light source to the reflecting surface, the set of three collimators are defined by a single moulded piece, in that the light ray input surface (13) comprises a set of globally tapered coaxial surfaces juxtaposed along a general optical axis of the optical device, wherein a generatrix of each surface of the set of three surfaces (S1, S2, S3) is concave, with concavity turned alternately towards the reflecting surface and towards a housing for receiving the light source, and in that the collimated light beam output surface includes striations that are irregularly distributed according to their position on the collimated light beam output surface and are closer to one another at a periphery of the collimated light beam output surface than at a center portion of the collimated light beam output surface.

2. Optical device according to claim 1, in which the generatrices comprise at least one form chosen from a parabola, a circle or a hyperbola.

3. Optical device according to claim 1, in which the reflecting surface (16) is parabolic.

4. Optical device according to claim 1, in which the reflecting surface (16) comprises a set of juxtaposed globally tapered coaxial surfaces.

5. Optical device according to claim 1, in which the light ray input surface (13) comprises a circular transverse input surface (15).

6. Optical device according to claim 5, in which a diameter of the circular transverse input surface is smaller than a diameter of the base of the reflecting surface from which the input surface refracting the light rays extends.

7. Optical device according to claim 5, in which the light ray input surface constitutes a dioptre.

8. Lighting and/or signaling light for aircraft comprising one or more optical devices according to claim 1.

* * * * *